US010280699B2

(12) United States Patent
Takahashi et al.

(10) Patent No.: US 10,280,699 B2
(45) Date of Patent: May 7, 2019

(54) DEGRADABLE RUBBER MEMBER FOR DOWNHOLE TOOLS, DEGRADABLE SEAL MEMBER, DEGRADABLE PROTECTING MEMBER, DOWNHOLE TOOL, AND METHOD FOR WELL DRILLING

(71) Applicant: Kureha Corporation, Tokyo (JP)

(72) Inventors: Takeo Takahashi, Tokyo (JP); Masayuki Okura, Tokyo (JP); Takuma Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/123,857

(22) PCT Filed: Mar. 4, 2015

(86) PCT No.: PCT/JP2015/056419
§ 371 (c)(1),
(2) Date: Sep. 6, 2016

(87) PCT Pub. No.: WO2015/133545
PCT Pub. Date: Sep. 11, 2015

(65) Prior Publication Data
US 2017/0016298 A1  Jan. 19, 2017

(30) Foreign Application Priority Data

Mar. 7, 2014 (JP) .................................. 2014-044611
Jul. 18, 2014 (JP) .................................. 2014-147571

(51) Int. Cl.
| | | |
|---|---|---|
| E21B 29/02 | (2006.01) | |
| E21B 33/12 | (2006.01) | |
| C08K 5/00 | (2006.01) | |
| C09K 8/42 | (2006.01) | |
| C08K 5/092 | (2006.01) | |
| C08K 5/1575 | (2006.01) | |
| C08K 5/42 | (2006.01) | |
| C08L 75/04 | (2006.01) | |
| C08K 3/012 | (2018.01) | |
| E21B 33/134 | (2006.01) | |
| E21B 43/26 | (2006.01) | |

(52) U.S. Cl.
CPC .............. *E21B 29/02* (2013.01); *C08K 3/012* (2018.01); *C08K 5/0016* (2013.01); *C08K 5/0033* (2013.01); *C08K 5/092* (2013.01); *C08K 5/1575* (2013.01); *C08K 5/42* (2013.01); *C08L 75/04* (2013.01); *C09K 8/426* (2013.01); *E21B 33/1208* (2013.01); *E21B 33/134* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 4,766,167 A | 8/1988 | Marnett et al. | |
| 4,924,941 A | 5/1990 | Farley | |
| 6,409,175 B1 | 6/2002 | Evans et al. | |
| 7,237,610 B1* | 7/2007 | Saini ..................... | C09K 8/035 166/279 |
| 8,887,816 B2* | 11/2014 | Liang ..................... | E21B 41/00 166/300 |
| 8,899,317 B2* | 12/2014 | Frazier ................. | E21B 33/134 166/123 |
| 2003/0060375 A1 | 3/2003 | Grainger et al. | |
| 2005/0011648 A1 | 1/2005 | Nguyen et al. | |
| 2005/0205265 A1 | 9/2005 | Todd et al. | |
| 2005/0205266 A1* | 9/2005 | Todd ..................... | E21B 23/00 166/376 |
| 2006/0113077 A1 | 6/2006 | Willberg et al. | |
| 2006/0169453 A1 | 8/2006 | Savery et al. | |
| 2006/0283591 A1 | 12/2006 | Willberg et al. | |

(Continued)

FOREIGN PATENT DOCUMENTS

| | | |
|---|---|---|
| CA | 2868975 A1 | 12/2013 |
| CN | 1420972 A | 5/2003 |

(Continued)

OTHER PUBLICATIONS

Canadian Office Action, dated Mar. 22, 2017, for Canadian Application No. 2,931,349.
Chinese Office Action and Search Report, dated Jan. 26, 2017, for Chinese Application No. 201580005658.4, with English translations.
Chinese Office Action and Search Report, dated, Jun. 8, 2017, for Chinese Application No. 201480055144.5, along with English translations.

(Continued)

*Primary Examiner* — Angela M DiTrani Leff
(74) *Attorney, Agent, or Firm* — Birch, Stewart, Kolasch & Birch, LLP

(57) ABSTRACT

A degradable rubber member for a downhole tool formed from a rubber material containing from 0.1 to 20 parts by mass of a degradation accelerator relative to 100 parts by mass of a degradable rubber (optionally containing other rubber materials and/or reinforcing materials), of which, preferably, the decrease rate of the mass or the 50% strain compressive stress after immersion for 24 hours in 150° C. water is not less than 5%, and/or the mass loss rate after immersion for 72 hours in 150° C. water is from 5 to 100%, and further, as desired, the tensile fracture strain at 66° C. is not less than 50%, the 70% strain compressive stress is not less than 10 MPa, and the compressive fracture strain is not less than 50%; a degradable seal member or a protecting member for downhole tools comprising such a rubber member; and a downhole tool such as a plug for well drilling, and a method for well drilling.

15 Claims, No Drawings

(56) References Cited

U.S. PATENT DOCUMENTS

| | | |
|---|---|---|
| 2007/0169935 A1 | 7/2007 | Akbar et al. |
| 2007/0277979 A1 | 12/2007 | Todd et al. |
| 2008/0182924 A1 | 7/2008 | Morimoto et al. |
| 2008/0200352 A1 | 8/2008 | Willberg et al. |
| 2008/0224413 A1 | 9/2008 | Doane et al. |
| 2008/0289823 A1 | 11/2008 | Willberg et al. |
| 2009/0242214 A1 | 10/2009 | Foster et al. |
| 2010/0132959 A1 | 6/2010 | Tinker |
| 2010/0139930 A1 | 6/2010 | Patel et al. |
| 2011/0067889 A1 | 3/2011 | Marya et al. |
| 2011/0132611 A1 | 6/2011 | Rytlewski et al. |
| 2011/0196125 A1 | 8/2011 | Wann |
| 2011/0277989 A1 | 11/2011 | Frazier |
| 2012/0035309 A1 | 2/2012 | Zhu et al. |
| 2012/0067581 A1* | 3/2012 | Auzerais ............ C04B 40/0633 166/308.1 |
| 2012/0085548 A1 | 4/2012 | Fleckenstein et al. |
| 2013/0025859 A1 | 1/2013 | Liang et al. |
| 2013/0183363 A1 | 7/2013 | Polaschegg |
| 2013/0233546 A1 | 9/2013 | Liang et al. |
| 2013/0237637 A1 | 9/2013 | Katou et al. |
| 2013/0240203 A1 | 9/2013 | Frazier |
| 2013/0292123 A1* | 11/2013 | Murphree ............... E21B 34/14 166/308.1 |
| 2014/0190685 A1 | 7/2014 | Frazier et al. |
| 2015/0051119 A1 | 2/2015 | Masaki et al. |
| 2015/0096741 A1 | 4/2015 | Okura et al. |
| 2015/0292292 A1 | 10/2015 | Okura et al. |
| 2015/0361326 A1 | 12/2015 | Masaki et al. |
| 2016/0108696 A1 | 4/2016 | Okura et al. |
| 2016/0177655 A1* | 6/2016 | Fripp .................... E21B 33/12 166/376 |

FOREIGN PATENT DOCUMENTS

| | | |
|---|---|---|
| CN | 101240088 A | 8/2008 |
| CN | 101273183 A | 9/2008 |
| CN | 103497386 A | 1/2014 |
| JP | 11-60928 A | 3/1999 |
| JP | 2000-319446 A | 11/2000 |
| JP | 2003-533619 A | 11/2003 |
| JP | 2012-12560 A | 1/2012 |
| PL | 221753 B1 | 5/2016 |
| WO | WO 2010/039131 A1 | 4/2010 |
| WO | WO 2013/132002 A1 | 9/2013 |
| WO | WO 2013/162002 A1 | 10/2013 |
| WO | 2013183363 A1 | 12/2013 |
| WO | WO 2014/010267 A1 | 1/2014 |
| WO | WO 2014/112479 A1 | 7/2014 |

OTHER PUBLICATIONS

Chinese Office Action for Chinese Application No. 201580005658.4, dated Jun. 29, 2017, with an English translation.
English translation of the International Search Report (form PCT/ISA/210), dated Mar. 31, 2015, for International Application No. PCT/JP2014/084045.
English translation of the International Search Report, dated May 19, 2015, for International Application No. PCT/JP2015/055959.
International Preliminary Report on Patentability and English translation of the Written Opinion of the International Searching Authority (forms PCT/IB/373, PCT/ISA/237 and PCT/IB/338), dated Jul. 7, 2016, for International Application No. PCT/JP2014/084045.
U.S. Office Action, dated Jul. 28, 2017, for U.S. Appl. No. 15/118,210.
International Preliminary Report on Patentability for International Application No. PCT/JP2015/056419 dated Sep. 22, 2016.
International Search Report of PCT/JP2015/056419 dated May 26, 2015.
Database WPI, Week 201418, Thomson Scientific, London, GB; AN 2014-E38537; XP002767496 (CN 103 497 386 A, Jan. 8, 2014, Abstract).
Database WPI, Week 201442. Thomson Scientific, London, GB; AN 2014-L91484; XP002767495 (PL 399 156 A1, Nov. 25, 2013, Abstract)
Extended European Search Report dated March 3, 2017, in European Patent Application No. 15757709.9.
Canadian Office Action and Search Report, dated Dec. 8, 2017, for Canadian Application No. 2,931,349.
Decision of Rejection dated Oct. 23, 2017, in Chinese Patent Application No. 201580005658.4, with English translation.
Japanese Notification of Reasons for Rejection, dated Dec. 26, 2017, for Japanese Application No. 2014-047564. with an English translation.
Japanese Notification of Reasons for Rejection, dated Jan. 9, 2018, for Japanese Application No. 2014-127561, with an English translation.
Chinese Office Action, dated Feb. 26, 2018, for Chinese Application No. 201580010065.7.
Second Office Action dated Mar. 20, 2018, in Chinese Patent Application No. 201480055144.5, with English translation.
U.S. Office Action, dated May 18, 2018, for U.S. Appl. No. 15/037,506.
Chinese Office Action and Search Report dated Oct. 19, 2018 for Application No. 201580010065.7, along with English translations.
Chinese Office Action dated Sep. 25, 2018 for Application No. 201480055144.5, along with an English translation.
European Office Action for Appl. No. 15757709.9 dated Dec. 5, 2018.

\* cited by examiner

DEGRADABLE RUBBER MEMBER FOR DOWNHOLE TOOLS, DEGRADABLE SEAL MEMBER, DEGRADABLE PROTECTING MEMBER, DOWNHOLE TOOL, AND METHOD FOR WELL DRILLING

TECHNICAL FIELD

The present invention relates to a degradable rubber member for downhole tools such as a plug for well drilling, a degradable seal member, a degradable protecting member, a downhole tool, and a method for well drilling used in well drilling for producing hydrocarbon resources such as petroleum or natural gas.

BACKGROUND ART

Hydrocarbon resources such as petroleum or natural gas have come to be produced by excavation through wells (oil wells or gas wells, also collectively called "wells") having a porous and permeable subterranean formation. As energy consumption increases, deeper wells are being drilled, reaching depths greater than 9000 m worldwide and greater than 6000 m in Japan. In wells that are continuously excavated, the productive layer is stimulated in order to continuously recover hydrocarbon resources efficiently from subterranean formations of which permeability has decreased over time and subterranean formations of which permeability has gradually become insufficient. Known stimulation methods include acid treatment and fracturing methods. Acid treatment is a method in which the permeability of the productive layer is increased by injecting a strong acid such as hydrochloric acid or hydrogen fluoride into the productive layer and dissolving the reactive components of bedrock (carbonates, clay minerals, silicates, and the like). However, various problems that accompany the use of strong acids have been identified, and increased costs, including various countermeasures, have also been pointed out. Thus, methods for forming fractures in the productive layer using fluid pressure (also called "fracturing" or "hydraulic fracturing") have received attention.

Hydraulic fracturing is a method in which fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures are formed by the hydraulic pressure in the deep subterranean productive layer (layer that produces the hydrocarbon resource such as petroleum or natural gas), and the productive layer is thereby stimulated in order to extract the hydrocarbon resource through the fractures. The efficacy of hydraulic fracturing has also been examined for the development of unconventional resources such as shale oil (oil that matures in shale) and shale gas.

The following method is typically used to perform a well treatment such as producing fractures and perforation by hydraulic pressure using a high-pressure fluid such as fracturing fluid in the productive layer of a deep subterranean formation (layer that produces a hydrocarbon resource such as petroleum such as shale oil or natural gas such as shale gas). Specifically, a prescribed section of a borehole (downhole) drilled in a subterranean formation several thousand meters deep is partially plugged while isolating sequentially from the tip portion of the borehole, and fractures are produced or perforation is performed in the productive layer by feeding a fluid such as fracturing fluid at high pressure into the plugged section or using a tool containing an explosive compound such as a perforation gun. Then, the next prescribed section (typically ahead of the preceding section, i.e., a segment closer to the ground surface) is plugged, and fracturing and the like are performed, causing the fractures and perforations to advance. After that, this process is repeated until the required isolation and fracturing and the like have been completed.

Stimulation of the productive layer is sometimes also performed again by fracturing not only for drilling of new wells but for desired sections of boreholes that have already been formed. In this case as well, the operations of borehole plugging, fracturing, and the like are similarly repeated. Additionally, there are also cases where, to perform finishing of the well, the borehole is plugged to block fluid from below, and after finishing of the top portions thereof is performed, the plugging is released.

A variety of downhole tools, which are tools used in a well to perform plugging and fracturing of a borehole, are known. For example, US 2011/0067889A1, US 2011/0277989 A1, and US 2005/0205266 A1 disclose plugs (also called "frac plugs", "bridge plugs", "packers", and the like) which plug or fix a borehole, having various members (various elements) disposing about the outer surface of a mandrel.

US 2011/0067889 A1 discloses an expandable and degradable plug in which a slip made of a metal or a seal made of an elastomer is disposed on the outer circumferential surface of a mandrel. US 2011/0277989 A1 discloses a degradable downhole plug comprising a slip, a conical member, or a malleable element formed from an elastomer or rubber or the like disposed on the outer circumferential surface of a mandrel, and an impediment such as a ball or flapper. US 2005/0205266 A1discloses a biodegradable downhole tool (frac plug) in which a packer element assembly comprising a slip and a plurality of sealing elements is disposed on the outer circumferential surface of a long tubular body member.

Furthermore, US 2010/0132959 A1 discloses a sleeve system (also called a "frac sleeve") in which fracture sleeve pistons (also called "pistons" or "piston plugs"), in which a passageway penetrates through the center part, are sequentially arranged so as to be movable in the axial direction of the sleeve, and sequential closed spaces are formed by ball sealers (also simply called "balls") and ball valve seats (also called "ball seats" or simply "seats").

Because downhole tools used for well drilling are sequentially disposed in the borehole until the well is completed and well treatments such as fracturing and perforation by high-pressure fluid are performed, they need to have sealing performance such that they plug (seal) the prescribed sections inside the borehole against the fluid pressure. At the same time, the seal needs to be easy to release when any well treatment is finished and the subsequent well treatment is to be performed. Additionally, the seal needs to be released and the used downhole tools removed at the stage when production of petroleum such as shale oil or natural gas such as shale gas (hereinafter collectively called "petroleum and natural gas" or "petroleum or natural gas") is begun. Because a downhole tool such as a plug is typically not designed to be retrievable after use and release of plugging, it is removed by destruction or by making it into small fragments by milling, drill out, or another method, but substantial cost and time are required for milling, drill out, and the like. There are also plugs specially designed to be retrievable after use (retrievable plugs), but since plugs are placed deep underground, substantial cost and time are required to retrieve all of them.

Additionally, downhole tools used in well drilling are arranged sequentially inside the well until the well is completed, and well treatment such as fracturing and perforation are carried out using high-pressure fluid. Then, various sensors, flow paths, and the like are arranged as downhole tool members in order that all well treatments can be completed, the seal can be released, and the next well treatment can be executed repeatedly in sequence. For these sensors, flow paths, and the like, when downhole tools are arranged inside a subterranean borehole, protection is performed by a protecting member or a protective coating so that breakage or damage does not occur due to friction, due to contact or collision with other members, or due to the high-pressure fluid used in well treatment. For example, a rubber material such a urethane rubber is used. When the sensors or flow paths are to perform their required functions, the protecting member or protective coating needs to be removed. Therefore, it has also come to be demanded that the protecting member for a downhole tool which protects the sensors, flow paths, and the like has a protective function for the sensors, flow paths, and the like, as well as a function of being easily removable or recoverable.

US 2011/0067889 A1 discloses that a slip or mandrel is formed from a degradable metal element such as a reactive metal. US 2011/0277989 A1 discloses having flappers, balls, and the like that degrade at a predetermined temperature, pressure, pH, or the like. US 2005/0205266 A1 discloses that a plug or member thereof is formed from a biodegradable material, but does not disclose specific uses. Furthermore, US 2010/0132959 A1 does not disclose that a frac sleeve is degradable.

Due to increased demand for securement of energy resources and environmental protection, particularly as excavation of unconventional resources expands, on one hand, excavation conditions are becoming increasingly harsh, such as increased depth, on the other hand, excavation is advancing under a diversity of excavation conditions, for example, a diversity of environmental conditions such as temperature conditions from less than 60° C. to approximately 200° C. attendant to the diversification of depth. Specifically, the downhole tool member used in downhole tools such as frac plugs, bridge plugs, packers, cement retainers, and sleeve systems (frac sleeves) need to have various properties. These properties include mechanical strength (tensile strength and compressive strength) to allow the member to be transported to a depth of several thousand meters underground, and oil-resistance, water-resistance, and heat-resistance such that mechanical strength and the like are maintained when the members come in contact with the hydrocarbon resource to be recovered in the high-temperature and high-humidity environment of a deep subterranean downhole. Furthermore, a downhole tool member, for example, a seal member for downhole tools (which qualifies as a rubber member for downhole tools) needs to have various characteristics such as seal performance such that it can maintain plugging even against high-pressure hydraulic pressure by sealing fluid between the downhole tool and the inner wall of the borehole, specifically the casing disposed inside the borehole, when the prescribed space of the downhole is plugged for performing perforation or fracturing, and at the same time, it needs to have the characteristic of being releasable when necessary. Additionally, downhole tool members need to have the characteristics of being both easily removable and capable of improving production efficiency by completely releasing the fluid seal within a desired period under the environmental conditions of the well at the stage when the well for well drilling is completed (as described above, there are a diversity of environments such as temperature conditions attendant to diversification of depth). Furthermore, protecting members for downhole tools need to have the characteristic of protecting sensors, flow paths, and the like while the downhole tools are disposed and during well treatment, and being releasable afterward.

Thus, due to the fact that excavation conditions for well drilling have become diverse such as increase depth, there is a need for a degradable seal member for downhole tools that, by reliably sealing fluid between the downhole tools and the casing, makes various well treatments easy to implement in well drilling that requires sealing operations such as perforation and fracturing; and that is also capable of contributing to decreased expense and shortening of processes and contributing to improved production efficiency due to being designable according to desire so that the sealing function can be reliably maintained for a desired period and the seal can be released during a desired period and its removal and a flow path can be assured in diverse downhole environments. Furthermore, there is a need for a protecting member for downhole tools that is similarly capable of contributing to decreased expense and shortening of processes and contributing to improved production efficiency due to having the characteristic of protecting sensors, flow paths, and the like while the downhole tools are disposed and/or well treatment is performed, and being releasable afterward.

CITATION LIST

Patent Literature

Patent Document 1: US Patent Application Publication No. 2011/0067889 A1 specification
Patent Document 2: US Patent Application Publication No. 2011/0277989 A1 specification
Patent Document 3: US Patent Application Publication No. 2005/0205266 A1 specification
Patent Document 4: US Patent Application Publication No. 2010/0132959 A1 specification

SUMMARY OF INVENTION

Technical Subject

A first aspect of the subject of the present invention is, due to the fact that excavation conditions for well drilling have become diverse such as increase depth, to provide a degradable rubber member for downhole tools that can be used in degradable seal members for downhole tools that, by reliably sealing fluid, make various well treatment processes easy to implement in well drilling that requires sealing operations such as perforation and fracturing; and that are also capable of contributing to decreased expense and shortening of processes and contributing to improved production efficiency due to being designable according to desire so that the sealing function can be reliably maintained for a desired period and the seal can be released after the passage of a desired period and its removal and a flow path can be assured in diverse downhole environments; and furthermore, that can be used in degradable protecting members for downhole tools that are similarly capable of contributing to decreased expense and shortening of processes and contributing to improved production efficiency due to having the characteristic of protecting sensors, flow paths, and the like while the downhole tools are disposed and/or well treatment is performed, and being releasable afterward. Another aspect of the subject of the present invention is to provide a downhole tool comprising the rubber member. Yet another aspect of the subject of the present invention is to provide a method for well drilling using the rubber member.

Solution to Subject

As a result of diligent research to solve the above subjects, the present inventors discovered that the subjects can be solved by forming a degradable rubber member for downhole tools from a rubber material containing a prescribed amount of degradation accelerator in a degradable rubber and completed the present invention.

Specifically, according to a first aspect of the present invention, (1) a degradable rubber member for downhole tools, comprising a rubber material containing from 0.1 to 20 parts by mass of a degradation accelerator relative to 100 parts by mass of a degradable rubber is provided.

Additionally, as another aspect according to the first aspect of the present invention, degradable rubber members for downhole tools of (2) to (4) below are provided.

(2) A degradable rubber member for downhole tools, comprising a rubber material containing from 0.1 to 20 parts by mass of a degradation accelerator relative to 100 parts by mass of a degradable rubber, of which a loss rate of mass or a decrease rate of 50% strain compressive stress after immersion for 24 hours in 150° C. water relative to mass or to 50% strain compressive stress before immersion is not less than 5%.

(3) The degradable rubber member for downhole tools according to (2) above, wherein a loss rate of mass after immersion for 72 hours in 150° C. water relative to a mass before immersion is from 5% to 100%.

(4) A degradable rubber member for downhole tools, comprising a rubber material containing from 0.1 to 20 parts by mass of a degradation accelerator relative to 100 parts by mass of a degradable rubber, of which a loss rate of mass after immersion for 72 hours in 150° C. water relative to mass before immersion is from 5% to 100%.

Additionally, as a specific aspect according to the first aspect of the present invention, degradable rubber members for downhole tools of (5) to (23) below are provided.

(5) The degradable rubber member for downhole tools according to any one of (1) to (4) above, wherein a tensile fracture strain at 66° C. is not less than 50%, a 70% strain compressive stress is not less than 10 MPa, and a compressive fracture strain is not less than 50%.

(6) The degradable rubber member for downhole tools according to (5) above, wherein a surface hardness is in the range of A60 to D80.

(7) The degradable rubber member for downhole tools according to any one of (1) to (6) above, wherein a ratio of compressive stress at 70% compressive strain relative to compressive stress at 5% compressive strain at 66° C. is not less than 5.

(8) The degradable rubber member for downhole tools according to any one of (1) to (7) above, wherein the member is stable in a dry environment, and a decrease rate of 50% strain compressive stress after immersion for 6 hours in 23° C. water relative to 50% strain compressive stress after immersion for 1 hour is less than 5%.

(9) The degradable rubber member for downhole tools according to any one of (1) to (8) above, wherein the degradation accelerator is an acidic substance.

(10) The degradable rubber member for downhole tools according to (9) above, wherein the acidic substance is an acid-generating substance.

(11) The degradable rubber member for downhole tools according to any one of (1) to (8) above, wherein the degradation accelerator is a plasticizer.

(12) The degradable rubber member for downhole tools according to any one of (1) to (8) above, wherein the degradation accelerator is at least one type selected from the group consisting of organic acids, inorganic acids, organic acid esters, inorganic acid esters, and acid anhydrides.

(13) The degradable rubber member for downhole tools according to any one of (1) to (8) above, wherein the degradation accelerator is at least one type selected from the group consisting of glycolide, lactide, ε-caprolactone, polyglycolic acid, polylactic acid, methyl p-toluenesulfonate, and 3,3',4,4'-benzophenone tetracarboxylic dianhydride.

(14) The degradable rubber member for downhole tools according to any one of (1) to (13) above, wherein the degradable rubber comprises at least one type selected from the group consisting of urethane rubber, natural rubber, isoprene rubber, ethylene propylene rubber, butyl rubber, styrene rubber, acrylic rubber, aliphatic polyester rubber, chloroprene rubber, polyester-based thermoplastic elastomer, and polyamide-based thermoplastic elastomer.

(15) The degradable rubber member for downhole tools according to any one of (1) to (14) above, wherein the degradable rubber contains a rubber having a hydrolyzable functional group.

(16) The degradable rubber member for downhole tools according to any one of (1) to (15) above, wherein the rubber material comprises a reinforcing material.

(17) The degradable rubber member for downhole tools according to any one of (1) to (16) above, wherein a bending modulus of elasticity at 23° C. is from 0.005 to 10 GPa.

(18) The degradable rubber member for downhole tools according to any one of (1) to (17) above, wherein the member is a seal member.

(19) The degradable rubber member for downhole tools according to (18) above, wherein the member is an annular molded article.

(20) The degradable rubber member for downhole tools according to (19) above, wherein the annular molded article is placed on an outer circumferential surface orthogonal to an axial direction of a mandrel provided in a downhole tool.

(21) The degradable rubber member for downhole tools according to any one of (1) to (17) above, wherein the member is a ball or a ball seat.

(22) The degradable rubber member for downhole tools according to any one of (1) to (17) above, wherein the member is a degradable protecting member for downhole tools.

(23) The degradable rubber member for downhole tools according to any one of (1) to (22) above, wherein the member is provided in a plug for well drilling.

Furthermore, according to another aspect of the present invention, (24) a downhole tool comprising the degradable rubber member for downhole tools described in any one of (1) to (23) above is provided, and preferably, (25) the downhole tool according to (24) above, wherein the tool is a plug for well drilling is provided.

According to other aspects of the present invention, (26) a method for well drilling, the method comprising using the degradable rubber member (degradable seal member) for downhole tools described in any one of (1) to (23) above, and particularly (27) a method for well drilling, the method comprising sealing fluid between a downhole tool and a casing using the degradable rubber member for downhole tools described in any one of (1) to (23) above, and (28) a method for well drilling, the method comprising performing isolation treatment of a borehole using the degradable rubber member (degradable seal member) for downhole tools described in any one of (1) to (23) above, after which the downhole tool is degraded, are provided.

As a specific aspect according to another aspect of the present invention, methods for well drilling of (29) to (32) below are provided.

(29) A method for well drilling, the method comprising sealing a borehole using a downhole tool comprising the degradable rubber member for downhole tools described in any one of (1) to (23) above, after which the downhole tool is degraded inside the borehole.

(30) A method for well drilling, the method comprising sealing a borehole using a downhole tool including the degradable rubber member for downhole tools described in any one of (1) to (23) above and another member for downhole tools containing a degradable material, after which the degradable rubber member for downhole tools is degraded inside the borehole.

(31) The method for well drilling according to (30) above, wherein the degradable material contained in the other member for downhole tools is polyglycolic acid.

(32) A method for well drilling, the method comprising performing a well treatment using a downhole tool comprising the degradable rubber member for downhole tools described in any one of (1) to (23) above, the downhole tool being disposed such that the degradable rubber member for downhole tools contacts another member for downhole tools and/or covers the other member for downhole tools, after which the degradable rubber member for downhole tools is degraded inside the borehole.

Advantageous Effects of Invention

The first aspect of the present invention is a degradable rubber member for downhole tools comprising a rubber material containing from 0.1 to 20 parts by mass of a degradation accelerator relative to 100 parts by mass of a degradable rubber. The degradable rubber member for downhole tools can be a seal member that can be designed to reliably seals fluid and makes various well treatments applied to a degradable easy based on diversification of excavation conditions, and that can be designed according to desire so that the seal can be released after the passage of a desired period and its removal and a flow path can be assured; and applied to a degradable protecting member that protects a sensor or a flow path and easily removes them afterward. This application allows the degradable rubber member for downhole tools to contribute to decreased expense and shortening of processes of well drilling. Another aspect of the present invention exhibits the effect of providing a downhole tool comprising the member, and a method for well drilling.

DESCRIPTION OF EMBODIMENTS

I. Degradable Rubber Member for Downhole Tools

The degradable rubber member for downhole tools according to the first aspect of the present invention is formed from a rubber material containing a prescribed amount of a degradation accelerator in a degradable rubber. Furthermore, the degradable rubber member for downhole tools of the present invention exhibits the effect of being capable of decreasing the expense and shortening the processes of well drilling by being applied to a degradable seal member for downhole tools or a degradable protecting member for downhole tools. The degradable rubber member for downhole tools of the present invention will be described using specific examples of, primarily, degradable seal members for downhole tools.

1. Degradable Rubber

As the degradable rubber serving as the rubber material that contains a prescribed amount of degradation accelerator and forms the degradable seal member (degradable rubber member) for downhole tools of the present invention, degradable rubbers that have been conventionally used to form degradable seal members for downhole tools may be used. As the degradable rubber contained in the rubber material that forms the degradable seal member for downhole tools, one type alone may be used, but a mixture of two or more types of degradable rubber may also be used.

Degradability

Degradability of the degradable rubber contained in the rubber material that forms the degradable rubber member (degradable seal member) for downhole tools means biodegradability, such that it is degraded by microorganisms in the soil in which the well treatment such as fracturing is performed; or means hydrolyzability, such that it is degraded by a solvent such as fracturing fluid, particularly by water, and also by acids or alkalis if desired, particularly, hydrolyzability, such that it is degraded by water of a predetermined temperature or higher; or means degradability, such that it can be degraded chemically by some other method. An example thereof also includes the state where the intrinsic strength of rubber decreases to become weak due to a decrease in the degree of polymerization or the like, resulting in the seal member (degradable rubber member) for downhole tools simply disintegrating and losing its shape when a very small mechanical force is applied (disintegrability).

Specific Examples of Degradable Rubber

Examples of the degradable rubber contained in the rubber material that forms the degradable seal member (degradable rubber member) for downhole tools include a degradable rubber containing at least one type selected from the group consisting of urethane rubber, natural rubber, isoprene rubber, ethylene propylene rubber, butyl rubber, styrene rubber, acrylic rubber, aliphatic polyester rubber, chloroprene rubber, polyester-based thermoplastic elastomer, and polyamide-based thermoplastic elastomer. Further examples include rubbers that are not necessarily called degradable rubbers, of which the 150° C. 24-hour compressive stress decrease rate is less than 5%, to be described later, that is, rubbers that, although they are so-called nondegradable rubbers, are capable of forming the degradable seal member for downhole tools by using a rubber material containing a prescribed amount of degradation accelerator, to be described later. In this case, these so-called nondegradable rubbers also qualify as the degradable rubber of the present invention.

In addition, from the perspective of degradability and disintegrability, preferred examples of the degradable rubber include degradable rubbers containing a rubber having a hydrolyzable functional group (for example, a urethane group, ester group, amide group, carboxyl group, hydroxyl group, silyl group, acid anhydride, acid halide, and the like). Note that here, "having a functional group" means having a functional group as a bond that forms the main chain of the rubber molecule, or, for example, having a functional group as a side chain of the rubber molecule serving as a crosslinking point. A particularly preferred example of the degradable rubber is a urethane rubber, since it is possible to easily control the degradability or disintegrability thereof by adjusting the structure, hardness, degree of crosslinking, and the like of the rubber or by selecting other compounding agents. Particularly preferred degradable rubbers are those containing urethane rubber having a hydrolyzable urethane bond. Similarly, degradable rubbers containing a polyester-based thermoplastic elastomer or a polyamide-based thermoplastic elastomer are also preferred.

Urethane rubber

The urethane rubber particularly preferably used as the degradable rubber contained in the rubber material that forms the degradable seal member (degradable rubber member) for downhole tools of the present invention (also called "urethane elastomer") is a rubber material having a urethane bond (—NH—CO—O—) in a molecule, and is normally obtained by condensation with an isocyanate compound and a compound having a hydroxyl group. As the isocyanate compound, aromatic (optionally having a plurality of aromatic rings), aliphatic, or alicyclic di-, tri-, or tetra-polyisocyanates or mixtures thereof are used. The compound having a hydroxyl group is broadly classified into polyester-type urethane rubbers having an ester-bond in the main chain thereof (also called "ester-type urethane rubbers" hereinafter) and polyether-type urethane rubbers having an ether-bond in the main chain thereof (also called "ether-type urethane rubbers" hereinafter). Ester-based urethane rubbers are preferred in many cases because their degradability and disintegrability are easier to control. Urethane rubber is an elastic body having both the elasticity (flexibility) of synthetic rubber and the rigidity (hardness) of plastics. Urethane rubber is generally known to have excellent abrasion resistance, chemical resistance, and oil resistance, high mechanical strength, high load tolerance, and high elasticity with high energy absorbency. Depending on the molding method, urethane rubber can be classified into i) kneaded (millable) type, which can be molded by the same processing methods as general rubber; ii) thermoplastic type, which can be molded by the same processing methods as thermoplastic resin, and iii) cast type, which can be molded by thermosetting liquid starting materials. Any type may be used as the urethane rubber that forms the degradable seal member for downhole tools of the present invention.

In particular, the molding method of the iii) cast type urethane rubber is generally classified into two methods, the one-shot method and the prepolymer method. In the one-shot method, all reaction component starting materials are mixed by stirring in a reactor, the mixture is casted into a mold, and after the reaction is nearly completed by primary heat treatment, the product is released from the mold and then secondary heat treatment is performed. Although the one-shot method is highly economical, it is unfit for large-scale molding because the heating generation is high. On the other hand, the prepolymer method includes two steps: a step of reacting polyol and diisocyanate in advance to synthesize a prepolymer, and a step of reacting the prepolymer with other necessary starting materials to produce an end product of urethane rubber. There are many advantages of the prepolymer method such as the fact that a urethane rubber with high physical properties is obtained because the reaction proceeds uniformly, large-scale molding with low total heat generation is possible, and segmented polyurethane with a freely selected curing agent can be produced. Nearly all cast urethane rubbers are produced by the prepolymer method.

Polyester-Based Thermoplastic Elastomer

The polyester-based thermoplastic elastomer that is preferably used as the degradable rubber contained in the rubber material that forms the degradable seal member (degradable rubber member) for downhole tools of the present invention is an elastomer containing a polyester-based block copolymer as the main component. Specific examples include block copolymers of a hard segment composed of polyester and a soft segment composed of polyether. Examples of the hard segment include aromatic polyesters and aliphatic polyesters, more specifically polyethylene terephthalate, polybutylene terephthalate, polyethylene naphthalate, polybutylene naphthalate, polyhydroxyalkanoic acid, and the like. Examples of the soft segment include polyethers such as polyethylene glycol, polypropylene glycol, polytetramethylene ether glycol, and the like. Other examples are block copolymers in which the hard segment and the soft segment are composed of polyesters. Examples of the hard segment include aromatic polyesters, more specifically polyethylene terephthalate, polybutylene terephthalate, polyethylene naphthalate, polybutylene naphthalate, and the like. Examples of the soft segment include aliphatic polyesters having lower elasticity than the elasticity of the hard segment, such as polyhydroxyalkanoic acids having an alkyl chain length of 2 or more. The types and the ratio of these hard segments and soft segments may be adjusted so as to conform to the desired physical properties of the elastomer, particularly the desired degradation characteristics and mechanical characteristics. Additionally, a polyester-based thermoplastic elastomer having the desired physical properties may be obtained by further combining various compounding agents as necessary. The polyester-based thermoplastic elastomer has the characteristics of both plastics and rubber, and can be molded by various molding techniques such as injection molding, extrusion molding, blow molding, or the like. Additionally, due to having an ester bond, the polyester-based thermoplastic elastomer has the characteristic of readily degrading or disintegrating in a prescribed time.

Polyamide-Based Thermoplastic Elastomer

The polyamide-based thermoplastic elastomer that is preferably used as the degradable rubber contained in the rubber material that forms the degradable seal member (degradable rubber member) for downhole tools of the present invention is a block copolymer of a hard segment composed of a polyamide and a soft segment composed of a polyether and/or polyester. Examples of the hard segment include aliphatic polyamides, more specifically Nylon 6, Nylon 11, and Nylon 12, and examples of the soft segment include polyethers such as polyethylene glycol, polypropylene glycol, polytetramethylene ether glycol, and the like. The types and the ratio of these hard segments and soft segments may be adjusted so as to conform to the desired physical properties of the elastomer, particularly the desired degradation characteristics and mechanical characteristics. Additionally, a polyamide-based thermoplastic elastomer having the desired physical properties may be obtained by further combining various compounding agents as necessary. The polyamide-based thermoplastic elastomer has intermediate properties between rubber and plastics, and can be molded by various mold processing techniques such as injection molding, extrusion molding, and blow molding. Additionally, due to having an amide bond, the polyamide-based thermoplastic elastomer has the characteristic of hydrolyzing and readily degrading or readily disintegrating at high temperature and high pressure.

Furthermore, nitrile rubbers or hydrogenated nitrile rubbers, which are rubbers that are conventionally used widely for downhole tools due to their excellent oil resistance, heat resistance, water resistance, and the like, often are not suitable as degradable rubber contained in rubber materials for forming the degradable seal member (degradable rubber member) for downhole tools of the present invention because it is normally difficult to achieve a 150° C. 24-hour compressive stress decrease rate within the prescribed range.

2. Degradation Accelerator

The degradation accelerator contained in the degradable seal member (degradable rubber member) for downhole tools of the present invention is a blended agent capable of accelerating degradation or disintegration of degradable rubber in the downhole environment in which the degradable seal member for downhole tools is used. In particular, it is a blended agent contained in a rubber material, capable of degrading a degradable rubber and especially accelerating hydrolysis of a degradable rubber. Due to the fact that it can be expected to reliably exhibit the effect of degrading degradable rubber, the degradation accelerator is preferably a blended agent having the function of breaking the bonds of the main chain of the rubber molecule of degradable rubber or the function of plasticizing degradable rubber. Thus, preferred degradation accelerators include acidic substances and plasticizers. Furthermore, the degradation accelerator preferably contains at least one type selected from the group consisting of organic acids, inorganic acids, organic acid esters, inorganic acid esters, and acid anhydrides.

Acidic Substance

Acidic substances are exemplified as preferred degradation accelerators in the degradable seal member (degradable rubber member) for downhole tools of the present invention. Since acidic substances break the bonds of the main chain of the rubber molecule of the degradable rubber contained in the rubber material that forms the degradable seal member (degradable rubber member) for downhole tools, they accelerate degradation of the rubber member, and as a result, accelerate degradation of the degradable seal member for downhole tools. Specifically, it is hypothesized that when the degradable seal member for downhole tools is formed from a rubber material that is a degradable rubber containing an acidic substance, the acidic substance normally is present in a uniformly dispersed state in the degradable rubber, and thus, the acidic substance contacts the molecules of the degradable rubber substantially. As a result, degradation of the degradable rubber material proceeds at higher speed than when degradation proceeds from the surface of the seal member, as is the case when, for example, the degradable seal member for downhole tools formed from the rubber material is immersed in water (optionally containing an acidic substance).

The acidic substance may be an acidic substance in the narrow sense such as an acid, or it may be an acid-generating substance that hydrolyzes to generate acid under certain conditions, for example, when the substance is immersed in water. In addition to acids such as organic acids and inorganic acids, examples of acid-generating substances include acid-generating substances known themselves as acid precursors, such as derivatives of hydrolyzable acids such as dimers, trimers, oligomers, or polymers of oxycarboxylic acids, derivatives of highly reactive organic acids such as sulfonic acid ester (which qualifies as an organic acid ester), and sulfonamides, which are sulfonic acid derivatives, acid anhydrides, and the like, and preferably organic acid esters, inorganic acid esters, and acid anhydrides. The acidic substance needs to be a substance that does not degrade, volatilize, or disappear until the degradable seal member for downhole tools is formed from the degradable rubber material containing a prescribed amount of acidic substance (during polymerization of the degradable rubber, during melt-kneading or melt-molding, and the like). Specific examples include saturated fatty acids having from 8 to 20 carbons, such as lauric acid; oxycarboxylic acids, such as glycolic acid, lactic acid, phosphoric acid, glycolide, glycolic acid oligomer, polyglycolic acid (PGA), lactide, lactic acid oligomer, polylactic acid (PLA), and ε-caprolactone, or derivatives thereof; sulfonic acid derivatives, such as methyl p-toluenesulfonate (MPTS), o/p-toluenesulfonamide, and N-butylbenzene sulfonamide; acid anhydrides such as 3,3', 4,4'-benzophenone tetracarboxylic acid dianhydride (BTDA); and the like. Particularly preferably, the degradation accelerator contains at least one type selected from the group consisting of glycolide, lactide, ε-caprolactone, PGA, PLA, MPTS, and BTDA.

As the method for adding these acidic substances to the reaction component starting materials for producing the degradable rubber, for example, when the acidic substances are contained in cast-type urethane rubber described previously, addition is normally performed by pouring the acidic substances into the prepolymer. More specifically, the prepolymer is preheated to approximately 80° C., and a prescribed amount of acidic substance is added to the prepolymer while stirring, and after stirring for approximately 3 to 5 minutes, defoaming and temperature adjustment of the prepolymer are performed (or, the temperature may be adjusted after defoaming and then the acidic substance added). Then, the curing agent is added to the mixture, the resulting mixture is poured into a mold in which temperature is adjusted to a predetermined temperature, and primary vulcanization (primary heat treatment) is completed, after which secondary vulcanization (secondary heat treatment) is performed. In primary vulcanization, with cast-type urethane rubber, for example, it normally takes approximately 30 to 60 minutes until the cast-type urethane rubber can maintain shape when mold release. It was found that when an acidic substance is added to the prepolymer, there are four types depending on the acidic substance: (1) a type with a typical vulcanization time, (2) a type with a vulcanization time shorter than typical vulcanization time, (3) a type that takes a longer time than typical vulcanization time, and (4) a type in which primary vulcanization does not proceed (it does not cure). There are also cases where the primary vulcanization is suppressed (it does not cure) when bond breaking by the acid occurs in parallel. For example, an acid such as glycolic acid causes bond breaking even during the curing reaction and also deactivates the curing agent by reacting with it, and as a result, there are cases where the curing reaction does not proceed if the acid is contained in an amount of approximately 5 parts by mass relative to 100 parts by mass of cast-type urethane rubber. Thus, an acidic substance that can release acid over time, for example, in the course of using a degradable rubber member for downhole tools, is preferred, and acid-producing substances such as glycolide, lactide, ε-caprolactone, PGA, PLA, MPTS, or BTDA exemplified previously are preferred.

The acidic substance may be in a miscible state or may be dispersed in granular state (also called "particulate") in degradable rubber contained in the rubber material that forms the degradable seal member (degradable rubber member) for downhole tools. For example, when an acidic substance is contained in the urethane rubber that is the degradable rubber, glycolide, lactide, glycolic acid, MPTS, and the like are often in the miscible state, and from the perspective of melting point and the like, PGA, PLA, BTDA and the like are often in dispersed in the granular state. Furthermore, there are cases where lauric acid is in the miscible state and dispersed in the granular state depending on temperature conditions and the like, and cases where it bleeds out from the molded product have also been observed visually. In either case, there is an effect of accelerating degradation of the degradable rubber, but normally, the degradation accelerating effect is larger when the lauric acid is in a miscible state. However, even when the lauric acid has been dispersed in granular or powder form with an appropriate dispersion diameter, there are no problems in use as long as it can degrade the degradable rubber member into a fine powder. The content of acidic substance as the degradation accelerator relative to 100 parts by mass of degradable rubber is not particularly limited, but it has a degradation accelerating effect on degradable rubber when the content thereof is in the range of normally from 0.1 to 20 parts by mass, often from 0.3 to 15 parts by mass, and in nearly all cases from 0.5 to 10 parts by mass. Furthermore, the content of an acid such as glycolic acid is preferably a small amount less than 5 parts by mass, more preferably less than 3 parts by mass, and even more preferably less than 2 parts by mass, so that the acid does not cause bond breakage or deactivation of the curing agent during the curing reaction.

Plasticizer

Additionally, plasticizers are also exemplified as preferred degradation accelerators in the degradable seal member (degradable rubber member) for downhole tools of the present invention. Plasticizers have a function of plasticizing (decreasing torque, softening, and the like) the degradable rubber contained in the rubber member that forms the degradable seal member (degradable rubber member) for downhole tools. This function accelerates infiltration of water (optionally containing an acidic substance or alkaline substance), which degrades, e.g., hydrolyzes, the degradable rubber in the degradable seal member (degradable rubber member) for downhole tools. Thus, it is hypothesized that, similar to what was described previously in regard to acidic substances, degradation of the degradable rubber proceeds more quickly than when degradation proceeds from the surface of the degradable seal member (degradable rubber member) for downhole tools. Examples of plasticizers include dibutyl phthalate, diisononyl phthalate, dioctyl phthalate, dioctyl adipate, diisononyl adipate, dibutyl sebacate, and the like. Since the presence or absence and the magnitude of the plasticizing effect on degradable rubber differs, the advantageous type of plasticizer is determined depending on the combination of the plasticizer and the degradable rubber. The content of plasticizer relative to 100 parts by mass of degradable rubber is not particularly limited, and the optimal range in which the plasticizer exhibits a degradation accelerating effect may be determined depending of the combination of plasticizer and degradable rubber as described previously. The plasticizer has a degradation accelerating effect on degradable rubber when the content thereof is in the range of normally from 0.1 to 20 parts by mass, often from 0.3 to 15 parts by mass, and in nearly all cases from 0.5 to 10 parts by mass.

Use of Degradation Accelerator

In addition to the acidic substances and plasticizers exemplified as preferred examples of degradation accelerators, other substances that exhibit the effect of accelerating degradation, especially hydrolysis, of the degradable rubber may be used. The degradation accelerator may be one compound alone or may contain two or more compounds, and further, may contain an acidic substance and a plasticizer, for example. Additionally, as described previously in regard to the acidic substance, the state in which the degradation accelerator is contained may be miscible or granular, but the degradation accelerator needs to be something that does not degrade, volatilize, or disappear during the time until the degradable seal member (degradable rubber member) for downhole tools is formed from the rubber material (during polymerization of the degradable rubber, during melt-kneading or melt-molding, and the like). The optimal range of content of the degradation accelerator may be selected depending on the combination of degradation accelerator and degradable rubber, but a degradation accelerator has a degradation accelerating effect on degradable rubber when the content thereof is in the range of normally from 0.1 to 20 parts by mass, often from 0.3 to 15 parts by mass, and in nearly all cases from 0.5 to 10 parts by mass, relative to 100 parts by mass of the degradable rubber. When the content of degradation accelerator is too low, the degradation accelerating effect on the degradable rubber is unsatisfactory and there is risk that the degradable seal member for downhole tools will not degrade and the seal will not be released within the desired time, and the effects of reducing expense and shortening the processes of well drilling may be lost. When the content of degradation accelerator is too high, there is risk that the seal will be released before the time for which fluid sealing by the degradable seal member for downhole tools is required in well treatment such as fracturing has elapsed, which may cause major problems in well drilling. Thus, it is possible to control degradation rate by means of the type or content of the degradation accelerator. Due to the fact that the degradable seal member for downhole tools of the present invention is formed from a rubber material containing from 0.1 to 20 parts by mass of degradation accelerator relative to 100 parts by mass of degradable rubber, degradation of the degradable rubber is accelerated. Thus, releasing of the seal of the degradable seal member for downhole tools, which is performed after well treatment has ended or after well drilling has been completed, can be performed at a lower temperature and/or in a shorter time. As a result, the seal can be released in a desired time regardless of diversification of excavation conditions, and the expense of well drilling can be reduced and the processes are shortened. Additionally, with the degradation accelerator, the degradable rubber contained in the rubber material that forms the degradable seal member for downhole tools can be degraded from the interior rather than from the surface of the seal member, and the degradable seal member for downhole tools after the seal is released can be more finely pulverized than the conventional. As a result, the recovery operation can be performed easily and rapidly after well treatment has ended or after well drilling has been completed.

3. Rubber Material Containing from 0.1 to 20 Parts by Mass of Degradation Accelerator Relative to 100 Parts by Mass of Degradable Rubber Other Components The degradable seal member (degradable rubber member) for downhole tools of the present invention is formed from a rubber material containing from 0.1 to 20 parts by mass of a degradation accelerator relative to 100 parts by mass of degradable rubber. The rubber material that forms the degradable seal member (degradable rubber member) for downhole tools may further contain, in addition to the degradable rubber and the prescribed amount of degradation accelerator, other resins (degradable polymers other than degradable rubber, and nondegradable resins or rubbers) and various additives such as stabilizers, colorants, and reinforcing materials as other components within a range that does not hinder the object of the present invention. In particular, the rubber material that forms the degradable seal member (degradable rubber member) for downhole tools may contain a reinforcing material. Furthermore, when the rubber material containing from 0.1 to 20 parts by mass of degradation accelerator relative to 100 parts by mass of degradable rubber contains degradable polymers other than degradable rubber or nondegradable resins or rubbers, preparation is performed such that the degradation accelerator is contained in an amount of 0.1 to 20 parts by mass relative to 100 parts by mass of degradable rubber.

Reinforcing Material

As reinforcing materials, conventionally used materials with the objective of improving mechanical strength or heat resistance of resin materials and the like may be used, and fibrous reinforcing materials or granular or powdered reinforcing materials may be used. The reinforcing materials may be contained typically in an amount of not greater than 150 parts by mass, and preferably in the range of 10 to 100 parts by mass, relative to 100 parts by mass of degradable rubber. When the rubber material that forms the degradable seal member (degradable rubber member) for downhole tools of the present invention contains a reinforcing material, it may be possible to perform sealing (protection, in a degradable rubber member) for the period required for treatment even when the downhole environment is close to the melting point (melt softening point) of the degradable rubber.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; fibrous substances of metals such as stainless steel, aluminum, titanium, steel, and brass; and organic fibrous substances with a high melting point such as aramid fibers, kenaf fibers, polyamides, fluorine resins, polyester resins, and acrylic resins; and the like. Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. These reinforcing materials may be respectively used alone or in combinations of two or more types. The reinforcing material may be treated with a sizing agent or surface treatment agent as necessary.

Other Resins

When acceleration of loss of sealing function is desired, degradable polymers other than degradable rubber, for example, polyglycolic acid, stereocomplex polylactic acid, polybutylene succinate, polybutylene adipate/terephthalate, polybutylene succinate/adipate, and the like, may be contained as other resins (degradable polymers other than degradable rubber, and nondegradable resins or rubbers) that may be further contained as other components within a range that does not hinder the object of the present invention.

Additionally, nondegradable resins and/or rubbers may be exemplified as other resins, specific examples of which include thermoplastic resins such as aromatic polyesters (polyethylene terephthalate and the like) and polystyrenes; and nondegradable rubbers such as nitrile rubber, hydrogenated nitrile rubber, and ethylene-propylene-diene terpolymer (EPDM). The content of the other resins when the rubber material contains other resins (degradable polymers other than degradable rubber, and nondegradable resins or rubbers) is within a range that does not hinder degradation of the degradable seal member (degradable rubber member) for downhole tools, normally not greater than 100 parts by mass and preferably not greater than 50 parts by mass relative to 100 parts by mass of degradable rubber.

4. Degradable Rubber Member for Downhole Tools

A degradable rubber member for downhole tools such as the degradable seal member for downhole tools of the present invention formed from a rubber material containing from 0.1 to 20 parts by mass of degradation accelerator relative to 100 parts by mass of degradable rubber may have the same configuration, structure, and shape as a degradable seal member for downhole tools or degradable protecting member for downhole tools, and may also have the same mechanical characteristics and the like as conventional members. As a result, the degradable rubber member for downhole tools of the present invention can be applied to the same applications and usage configurations as conventional members. Specific examples of degradable seal members for downhole tools will be described below.

150° C. 24-Hour Mass Loss Rate

From the perspective of reliably exhibiting degradability in a downhole environment, the degradable rubber member for downhole tools of the present invention also preferably has a loss rate of mass after immersion for 24 hours in 150° C. water relative to mass before immersion (also called "150° C. 24-hour mass loss rate" hereinafter) of not less than 5%. For the 150° C. 24-hour mass loss rate of the degradable rubber member for downhole tools, a sample of the degradable rubber member for downhole tools cut out to a size of 20 mm each in thickness, length, and width is immersed in 400 mL of 150° C. water (deionized water or the like) and then removed after 24 hours, and by comparing the mass of the sample measured after immersion to the mass of the sample measured in advance before immersion in 150° C. water (also called "initial mass" hereinafter), the loss rate (unit: %) of mass relative to the initial mass is calculated. When the degradable rubber member for downhole tools degrades and leaches out while immersed in 150° C. water and loses its shape or disappears, the loss rate is taken to be 100%.

Due to the fact that the degradable rubber member for downhole tools has a 150° C. 24-hour mass loss rate of not less than 5%, the degradable rubber member (degradable seal member) for downhole tools formed from a rubber material containing a prescribed amount of degradation accelerator degrades or disintegrates and more preferably disappears (also collectively stated as "decomposes" in the present invention) within several hours to several weeks in a downhole environment (there are downhole environments at temperatures from approximately 60° C. to approximately 200° C., and recently at low temperatures from approximately 25 to 40° C. because of diversification of depth), and therefore the sealing function of the degradable rubber member (degradable seal member) for downhole tools is lost. This can contribute to reduced expense or shortening of processes for well drilling. A degradable rubber member (degradable seal member) for downhole tools needs to have a diversity of sealing function maintenance time and function loss time according to the environment such as downhole temperature and according to the processes carried out in that environment. Due to the fact that the degradable rubber member (degradable seal member) for downhole tools of the present invention preferably has a 150° C. 24-hour mass loss rate of not less than 5%, more preferably not less than 10%, even more preferably not less than 50%, particularly preferably not less than 80%, most preferably not less than 90%, and an upper limit of 100%, in conjunction with the function of the degradation accelerator the degradable rubber member for downhole tools of the present invention can have the characteristic of exhibiting a sealing function for a certain time and then losing the sealing function and releasing the seal in a variety of downhole temperature environments, such as 177° C. (350° F.), 163° C. (325° F.), 149° C. (300° F.), 121° C. (250° F.), 93° C. (200° F.), 80° C., or 66° C., as well as 25 to 40° C. The factors that control the 150° C. 24-hour mass loss rate of the degradable rubber member for downhole tools and the degree to which it can be controlled differ depending on the type of degradable rubber contained in the rubber material that forms the degradable rubber member for downhole tools. For example, it is possible to control the degradation rate by the following means: adjusting the degree of vulcanization, i.e., controlling the extent of crosslinking between molecular chains; changing the vulcanization method and changing the type and ratio of the crosslinking agent; changing the degree of hardness (in general, degradation is suppressed when hardness is increased, and degradation is accelerated when hardness is decreased); adjusting the type and quantity of fillers and/or blending agents such as hydrolysis inhibitors in the rubber material; and changing molding conditions and curing conditions.

150° C. 24-Hour Compressive Stress Decrease Rate

From the perspective of reliably exhibiting degradability in a downhole environment, the degradable rubber member for downhole tools of the present invention preferably has a decrease rate of 50% strain compressive stress after immersion for 24 hours in 150° C. water relative to 50% strain compressive stress before immersion (also called "150° C. 24-hour compressive stress decrease rate" hereinafter) of not less than 5%. The method of measuring the 150° C. 24-hour compressive stress decrease rate of the degradable rubber member for downhole tools is as follows. Specifically, a sample of a prescribed shape (a sample cut out to a size of 5 mm each in thickness, length, and width is used) is immersed in 400 mL of 150° C. water (deionized water, or the like) and then removed after 24 hours, and the compressive stress at room temperature is measured in accordance with JIS K7181 (conforming to ISO 604), and the compressive stress at 50% compressive strain (unit: MPa; also called "50% strain compressive stress" hereinafter) is determined. The decrease rate (unit: %) relative to the initial compressive stress is calculated by comparing the determined value with the 50% strain compressive stress measured in advance before immersion in 150° C. water ("initial compressive stress"). When the degradable rubber member for downhole tools degrades and leaches out and loses its shape or disappears while immersed in 150° C. water, or, when the degradable rubber member for downhole tools disintegrates before reaching 50% strain when compressive stress is measured, the decrease rate is taken to be 100%.

The initial compressive stress of the degradable rubber member for downhole tools of the present invention, i.e., the 50% strain compressive stress before immersion in 150° C. water, is not particularly limited as long as the strength of the degradable rubber member for downhole tools is maintained and it can reliably continue to plug the downhole for the duration required to perform well treatment such as fracturing in a deep underground downhole (the required duration including transport or moving the plug to the prescribed location, plugging the downhole with the degradable rubber member for downhole tools, and preparation for and implementation of perforation or fracturing; generally about 1 to 2 days). However, it is normally not less than 5 MPa, and often not less than 7 MPa, and particularly preferably not less than 10 MPa.

There is no particular upper limit on the initial 50% strain compressive stress of the degradable rubber member for downhole tools, but from the perspectives of ease of handling and degradability (or disintegrability), it is normally not greater than 200 MPa, and often not greater than 150 MPa.

Due to the fact that the degradable rubber member for downhole tools has a 150° C. 24-hour compressive stress decrease rate of not less than 5%, the degradable rubber member (degradable seal member) for downhole tools formed from a rubber material containing a prescribed amount of degradation accelerator degrades or disintegrates and disappears within a desired period of several hours to several weeks in a downhole environment (there are downhole environments at temperatures from approximately 60° C. to approximately 200° C., and recently at low temperatures from 25 to 40° C. because of diversification of depth), and therefore the sealing function of the degradable rubber member (degradable seal member) for downhole tools is lost. Thus, it does not require a great deal of expense or time for retrieval or physical destruction or the like, and can contribute to reduced expense or shortening of processes for well drilling. A degradable rubber member (degradable seal member) for downhole tools needs to have a diversity of sealing function maintenance time and function loss time according to the environment such as downhole temperature and according to the processes carried out in that environment. Due to the fact that the degradable rubber member (degradable seal member) for downhole tools of the present invention has a 150° C. 24-hour compressive stress decrease rate of preferably not less than 5%, more preferably not less than 20%, even more preferably not less than 50%, particularly preferably not less than 70%, and most preferably 100%, in conjunction with the function of the degradation accelerator the degradable rubber member can have the characteristic of exhibiting a sealing function for a certain period of time and then losing the sealing function and releasing the seal in a variety of downhole temperature environments, such as 177° C., 163° C., 149° C., 121° C., 93° C., 80° C., or 66° C., as well as 25 to 40° C.

Furthermore, the factors that control the 150° C. 24-hour compressive stress decrease rate of the degradable rubber member for downhole tools and the degree to which it can be controlled differ depending on the type of degradable rubber contained in the rubber material that forms the degradable rubber member for downhole tools as previously described. For example, it is possible to control the degradation rate by the following means: adjusting the degree of vulcanization, i.e., controlling the extent of crosslinking between molecular chains; changing the vulcanization method and changing the type and ratio of the crosslinking agent; changing the degree of hardness (in general, degradation is suppressed when hardness is increased, and degradation is accelerated when hardness is decreased); adjusting the type and quantity of fillers and/or adding agents such as hydrolysis inhibitors in the rubber material; and changing molding conditions and curing conditions. The upper limit of the 150° C. 24-hour compressive stress decrease rate of the degradable rubber member for downhole tools is 100%.

The degradable rubber member for downhole tools of the present invention may be adjusted as necessary so that the 150° C. 24-hour compressive stress decrease rate is 100% and the decrease rate of the 50% strain compressive stress after immersion for 24 hours in water of various temperatures, such as 93° C., 66° C., 40° C. or 25° C., relative to the 50% strain compressive stress before immersion is, for example, not greater than 50%, not greater than 30%, not greater than 10%, or less than 5%.

150° C. 72-Hour Mass Loss Rate

From the perspective of reliably exhibiting degradability in a downhole environment, the degradable rubber member for downhole tools of the present invention also preferably has a loss rate of mass after immersion for 72 hours in 150° C. water relative to mass before immersion (also called "150° C. 72-hour mass loss rate" hereinafter) of 5 to 100%. The 150° C. 72-hour mass loss rate of the degradable rubber member for downhole tools is calculated similarly to what was previously described for the 150° C. 24-hour mass loss rate as follows: a sample of the degradable rubber member for downhole tools cut out to a size of 20 mm each in thickness, length, and width is immersed in 400 mL of 150° C. water (deionized water or the like) and then removed after 72 hours, and the mass of the sample measured after immersion and the mass of the sample measured in advance before immersion in 150° C. water (initial mass) were compared. Due to the fact that the degradable rubber member for downhole tools has a 150° C. 72-hour mass loss rate of 5 to 100%, the degradable rubber member (degradable seal member) for downhole tools formed from a rubber material containing a prescribed amount of degradation accelerator degrades or disintegrates and more preferably disappears (also collectively stated as "decomposes" in the present invention) within several hours to several weeks in a downhole environment (there are downhole environments at temperatures from approximately 60° C. to approximately 200° C., and recently at low temperatures from 25 to 40° C. because of diversification of depth,), and therefore the sealing function of the degradable rubber member (degradable seal member) for downhole tools is lost. This can contribute to reduced expense or shortening of processes for well drilling. A degradable rubber member (degradable seal member) for downhole tools needs to have a diversity of sealing function maintenance time and function loss time according to the environment such as downhole temperature and according to the processes carried out in that environment. Due to the fact that the degradable rubber member (degradable seal member) for downhole tools of the present invention has a 150° C. 72-hour mass loss rate of more preferably from 10 to 100%, even more preferably from 50 to 100%, particularly preferably from 80 to 100%, and most preferably from 90 to 100%, in conjunction with the function of the degradation accelerator to be described later the degradable rubber member can have the characteristic of exhibiting a sealing function for a certain period of time and then losing the sealing function and releasing the seal in a variety of downhole temperature environments, such as 177° C., 163° C., 149° C., 121° C., 93° C., 80° C., or 66° C., as well as 25 to 40° C. The factors that control the 150° C. 72-hour mass loss rate of the degradable rubber member for downhole tools and the degree to which it can be controlled are the same as what was previously described for the 150° C. 24-hour mass loss rate.

66° C. Tensile Fracture Strain

The degradable rubber member for downhole tools of the present invention is preferred because, according to desire, the strength of the degradable rubber member for downhole tools is maintained and it can reliably continue to plug the downhole (or protect sensors and the like in the case of a degradable protecting member; similarly hereinafter) for the duration required to perform well treatment such as fracturing, due to the fact that the tensile fracture strain at 66° C. (also called "66° C. tensile fracture strain" hereinafter) is not less than 50%. Specifically, when a borehole is plugged (sealed) using the degradable rubber member for downhole tools, there is no risk of the degradable rubber member for downhole tools breaking even if it is deformed so as to securely fit to the shape of the downhole tool and the shape of the downhole (shape of the casing), and specifically, even if it is deformed while incurring large tensile force (and compressive force). Therefore, the contact area of the degradable rubber member for downhole tools and the casing is large, resulting in reliable plugging. Additionally, the degradable rubber member for downhole tools has the effect that the fluid seal is difficult to break even if it incurs large tensile force (and compressive force) due to extremely high pressure being applied by fluid for implementing a treatment that requires sealing such as fracturing. The 66° C. tensile fracture strain is measured at 66° C. in accordance with ISO 37 (JIS K6251). The 66° C. tensile fracture strain is preferably not less than 80%, and more preferably not less than 100%. The 66° C. tensile fracture strain does not have a particular upper limit, but it is normally not greater than 500% and often not greater than 480% because if the 66° C. tensile fracture strain is too high, the degradable rubber member for downhole tools may not easily break into small fragments when it is degraded and loses strength after the required well treatments.

66° C. Compressive Stress

The degradable rubber member for downhole tools of the present invention is preferred because, according to desire, the strength of the degradable rubber member for downhole tools is maintained and it can more reliably continue to plug the downhole for the duration required to perform well treatment such as fracturing, due to the fact that the 70% strain compressive stress at 66° C. (also called "66° C. compressive stress" hereinafter) is not less than 10 MPa. Specifically, when a borehole is plugged (sealed) using the degradable rubber member for downhole tools, there is no risk of the degradable rubber member for downhole tools breaking even if it is deformed so as to securely fit to the shape of the downhole tool and the shape of the downhole (shape of the casing), and specifically, even if it is deformed while incurring large compressive force (and tension). Therefore, the contact area of the degradable rubber member for downhole tools and the casing is large, resulting in reliable plugging. Additionally, the degradable rubber member for downhole tools has the effect that the fluid seal is difficult to break even if it incurs large compressive force (and tensile force) due to extremely high pressure being applied by fluid for implementing a treatment that requires sealing such as fracturing. The 66° C. compressive stress represents the compressive stress at compressive strain of 70% (unit: MPa) or, when it fractures before reaching compressive strain of 70%, the maximum stress value until fracture, measured at 66° C. in accordance with ISO 14126 (JIS K7018). The 66° C. compressive stress is more preferably not less than 20 MPa, and even more preferably not less than 30 MPa. The upper limit of the 66° C. compressive stress is not particularly limited, but is normally not greater than 200 MPa, and often not greater than 150 MPa.

66° C. Compressive Fracture Strain

The degradable rubber member for downhole tools of the present invention is preferred because, according to desire, the strength of the degradable rubber member for downhole tools is maintained and it can reliably continue to plug the downhole for the duration required to perform well treatment such as fracturing, due to the fact that the compressive fracture strain at 66° C. (also called "66° C. compressive fracture strain" hereinafter) is not less than 50%. The 66° C. compressive fracture strain is measured at 66° C. in accordance with ISO 14126. The 66° C. compressive fracture strain is more preferably not less than 60%, and even more preferably not less than 70%. The upper limit of the 66° C. compressive fracture strain is 100%, but is normally not greater than 99%.

Surface Hardness

In addition to the desired characteristics of 66° C. tensile fracture strain, 66° C. compressive stress, and 66° C. compressive fracture strain described above, it is preferred that the degradable rubber member for downhole tools of the present invention further has surface hardness in the range of A60 to D80 from the perspective of sealing function. The surface hardness of a rubber material that forms the degradable rubber member for downhole tools means the surface hardness expressed as type A (also called "surface hardness A" or simply "hardness A" hereinafter) or type D (also called "surface hardness D" or simply "hardness D" hereinafter) of durometer hardness measured in accordance with ISO 7619. Types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60). Due to the fact that the hardness of the rubber material that forms the degradable rubber member for downhole tools of the present invention is in the range of A60 to D80, it can be configured such that borehole sealing can be performed while withstanding the high-pressure fluid pressurization such as fracturing and the like by also adjusting the structure and the like of the rubber member according to desire. The surface hardness of the rubber material that forms the degradable rubber member for downhole tools is more preferably in the range of A65 to D78, and even more preferably A70 to D75.

23° C. Compressive Stress Decrease Rate

The degradable rubber member for downhole tools of the present invention is preferred because, according to desire, the strength of the degradable rubber member for downhole tools is maintained and it can more reliably continue to plug the downhole for the duration required to perform well treatment such as fracturing, due to the facts that it is stable in a dry environment and that the decrease rate of the 50% strain compressive stress after immersion for 6 hours in 23° C. water relative to the 50% strain compressive stress after immersion for 1 hour (also called "23° C. compressive stress decrease rate" hereinafter) is less than 5%. Specifically, plugging (in a protecting member, a protecting function of sensors or the like) of the downhole is no longer lost in an unexpectedly short time regardless to the fact that excavation conditions for well drilling have become diverse. In particular, since the degradable rubber member for downhole tools is stable in a dry environment, the sealing function (in a protecting member, a protecting function) is not lost at the stage where the downhole tool comprising the degradable rubber member for downhole tools of the present invention is arranged in a borehole and before well treatment such as fracturing is performed. The method of measuring the 23° C. compressive stress decrease rate of the degradable rubber member for downhole tools is the same as the method of measuring the 150° C. 24-hour compressive stress decrease rate, but instead of being immersed in 150° C. water, it is immersed for the required time in 23° C. water. The 23° C. compressive stress decrease rate is more preferably less than 4%, and even more preferably less than 3%. The lower limit of the 23° C. compressive stress decrease rate is 0%. Note that for the degradable rubber member for downhole tools of the present invention, "stable in a dry environment" means that the compressive stress does not decrease for at least 168 hours (7 days) in an environment at temperature 23° C. and relative humidity 50%.

66° C. Compressive Stress Ratio

The degradable rubber member for downhole tools of the present invention is preferred because, according to desire, the strength of the degradable rubber member for downhole tools is maintained and it can more reliably continue to plug the downhole for the duration required to perform well treatment such as fracturing, due to the fact that the ratio of the 70% strain compressive stress relative to the compressive stress at 5% compressive strain at 66° C. (also called "66° C. compressive stress ratio" hereinafter) is not less than 5. Specifically, when a borehole is plugged (sealed) using the degradable rubber member for downhole tools, the rubber member is capable of deforming so as to securely fit to the shape of the downhole tool and the shape of the downhole (shape of the casing) because the initial compressive strain of the degradable rubber member for downhole tools is small (it deforms easily). Additionally, when the rubber member is deformed while incurring large compressive force (and tensile force), due to the stress of the rubber member rising greatly in regions where the amount of deformation is large, it results in a state where the rubber member of the contact portion of the rubber member with the casing has a high compressive force (and tensile force). As a result, even when high pressure is applied, for example when a well treatment requiring a seal such as fracturing is performed, the rubber member has sufficient seal performance and plugging is reliable. The 66° C. compressive stress ratio is measured at 66° C. in accordance with ISO 14126 (JIS K7018). The 66° C. compressive stress ratio is more preferably not less than 8, and even more preferably not less than 10. The upper limit of the 66° C. compressive stress ratio is not particularly limited, but is normally not greater than 200, and often not greater than 150. Furthermore, in many cases, if the degradable rubber member for downhole tools of the present invention which has a 66° C. compressive stress ratio of not less than 5 also has a ratio of compressive stress at 70% compressive strain relative to compressive stress at 5% compressive strain of not less than 5 at other temperatures, such as, for example, the range from room temperature to 177° C., it is more desirable because it can fulfill the sealing function and the like in the aforementioned wide temperature range. However, even if the above compressive stress ratio of the degradable rubber member for downhole tools is less than 5 in part of the above temperature range, for example, at temperature 149° C., the degradable rubber member for downhole tools is practical as long as the 66° C. compressive stress ratio is not less than 5.

Bending Modulus of Elasticity

From the perspective of reliably exhibiting a sealing function in diverse downhole environments, the degradable seal member (degradable rubber member) for downhole tools of the present invention may have a bending modulus of elasticity at 23° C. from 0.005 to 10 GPa, as desired. If the bending modulus of elasticity at 23° C. of the degradable seal member for downhole tools of the present invention is in the range from 0.005 to 10 GPa, when a borehole is plugged in a downhole environment of temperature 177° C., 163° C., 149° C., 121° C., 93° C., 80° C., or 66° C., as well as 25 to 40° C., for example, when a fluid between the downhole tool and the casing is sealed, the degradable seal member (degradable rubber member) for downhole tools can deform so as to securely fit to the shape of the downhole tool and the shape of the casing because the bending modulus of elasticity of the degradable seal member for downhole tools decreases to an appropriate degree in that downhole environment. Thus, the contact area between the degradable seal member for downhole tools and the casing is large and plugging is reliable. Additionally, there is the effect that the fluid seal (or protection in the case of a degradable protecting member) is difficult to break even if extremely high pressure is applied by fluid for implementing a treatment that requires sealing such as fracturing. The bending modulus of elasticity at 23° C. is measured in accordance with JIS K7113 (corresponding to ISO 178).

From the perspective of obtaining a degradable seal member (degradable rubber member) for downhole tools that is easily deformable to assure sealing function in a downhole environment, its bending modulus of elasticity at 23° C. is preferably not greater than 9 GPa, more preferably not greater than 8 GPa, and even more preferably not greater than 7 GPa, which is effective particularly in seal members greater than 5 mm thick. When the bending modulus of elasticity at 23° C. of the degradable seal member for downhole tools is too low, the degradable seal member deforms and the seal ends up being destroyed when high fluid pressure is applied. Thus, the bending modulus is preferably not less than 0.008 GPa, more preferably not less than 0.01 GPa, and even more preferably not less than 0.02 GPa.

Degradation of Rubber Member Within Downhole Environment

The degradable seal member (degradable rubber member) for downhole tools of the present invention is selected from those formed from a rubber material containing a prescribed amount of degradation accelerator in a degradable rubber. This allows the degradable seal member for downhole tools to lose its sealing function and release the seal due to degradation of the degradable rubber accelerated by the degradation accelerator within several hours to several weeks, or within several days according to desire, in the downhole environments described previously (there are downhole environments at temperatures from approximately 60° C. (140° F.) to 204° C. (400° F.), and recently at low temperatures from approximately 25 to 40° C. because of diversification of depth). In the case of a degradable protecting member for downhole tools, it can release protection of sensors and flow paths and the exposed sensors and flow paths can exhibit their original functions.

For example, when 5 parts by mass of glycolide (qualifying as an acid-generating substance) relative to 100 parts by mass of thermosetting polyurethane (urethane rubber) of hardness A82° was contained as a degradation accelerator, the compressive stress decrease rate (excluding those immersed in 66° C. water, the 50% strain compressive stress was measured and calculated in the same manner as "150° C. 24-hour compressive stress decrease rate" described above; similarly for the other temperatures) was 32% and the mass loss rate (excluding those immersed in 66° C. water, it was measured and calculated in the same manner as "150° C. 24-hour mass loss rate" described above; similarly for the other temperatures) was −10.1% after immersion in 66° C. water for 24 hours, the mass loss rate was −1.8% after immersion for 48 hours, the compressive stress decrease rate was 100% (this means the case where the degradable rubber member for downhole tools degrades and leaches out and loses its shape or disappears while immersed in 66° C. water, or the case where the degradable rubber member for downhole tools disintegrates before reaching 50% strain when compressive stress is measured; similarly for other temperatures) and the mass loss rate was −1.9% after immersion for 72 hours, the compressive stress decrease rate was 100% and the mass loss rate was −0.1% after immersion for 168 hours; the compressive stress decrease rate was 55% and the mass loss rate was −1.9% after immersion for 24 hours in 80° C. water, the mass loss rate was −2.2% after immersion for 48 hours, the compressive stress decrease rate was 100% and the mass loss rate was −1.4% after immersion for 72 hours, and the mass loss rate was 8.4 after immersion for 168 hours.

Furthermore, when 1 part by mass of MPTS relative to 100 parts by mass of thermosetting polyurethane (urethane rubber) of hardness A82° was contained as a degradation accelerator, the compressive stress decrease rate was 100% and the mass loss rate was −1.6% after immersion in 66° C. water for 24 hours, the mass loss rate was 3.2% after immersion for 48 hours, the compressive stress decrease rate was 100% and the mass loss rate was 10.4% after immersion for 72 hours, the compressive stress decrease rate was 100% and the mass loss rate was 33.5% after immersion for 168 hours; the compressive stress decrease rate was 100% and the mass loss rate was 4.5% after immersion for 24 hours in 80° C. water, the mass loss rate was 17.9% after immersion for 48 hours, the compressive stress decrease rate was 100% and the mass loss rate was 29.5% after immersion for 72 hours, the compressive stress decrease rate was 100% and the mass loss rate was 49.8% after immersion for 168 hours, and cracking and the like occurred in the sample before it was removed. Similarly, when 5 parts by mass of MPTS relative to 100 parts by mass of thermosetting polyurethane (urethane rubber) of hardness A82° was contained as a degradation accelerator, the compressive stress decrease rate was 100% and the mass loss rate was 26.5% after immersion in 66° C. water for 24 hours, the mass loss rate was 38.0% after immersion for 48 hours, the compressive stress decrease rate was 100% and the mass loss rate was 46.0% after immersion for 72 hours, the compressive stress decrease rate was 100% and the mass loss rate was 50.8% after immersion for 168 hours, and after immersion for 48 hours or longer, cracking and the like occurred in the sample before it was removed. Furthermore, the compressive stress decrease rate was 100% and the mass loss rate was 44.5% after immersion for 24 hours in 80° C. water, the compressive stress decrease rate was 100% and the mass loss rate was 50.6% after immersion for 48 hours, the compressive stress decrease rate was 100% and the mass loss rate was 83.1% after immersion for 72 hours, the compressive stress decrease rate was 100% after immersion for 168 hours, and after immersion for 24 hours or longer, cracking and the like occurred in the sample before it was removed.

Additionally, when the prescribed amounts of the degradation accelerators listed below relative to 100 parts by mass of thermosetting polyurethane (urethane rubber) of hardness A82° were contained as degradation accelerators, the compressive strain decrease rates and mass loss rates after immersion for the prescribed time in 66° C. or 80° C. water were as shown in Table 1. Note that as the degradable rubber in the degradable rubber member for downhole tools containing 10 parts by mass of glycolide (the two columns denoted as "glycolide*" and glycolide**"), thermosetting polyurethane (urethane rubber) of hardness A96° and thermosetting polyurethane (urethane rubber) of hardness A90°, respectively, were used.

TABLE 1

| Immersion in water | | Degradation accelerator and content (parts by mass relative to 100 parts by mass of urethane rubber) | | | | | | | | | | |
|---|---|---|---|---|---|---|---|---|---|---|---|---|
| Water temperature | Immersion time | Glycolide 5 | Glycolide* 10 | Glycolide** 10 | Glycolide 1 | MPTS 1 | MPTS 5 | BTDA 1 | Lauric acid 1 | Lauric acid 5 | PGA 5 | None 0 |
| Compressive stress decrease rate (%) | | | | | | | | | | | | |
| 66° C. | 24 hours | 32 | 29 | 32 | — | 100 | 100 | — | — | 21 | — | 0 |
| | 72 hours | 100 | 100 | 100 | 1 | 100 | 100 | — | −10 | 18 | 25 | 0 |
| | 168 hours | 100 | 100 | 100 | 12 | 100 | 100 | 17 | 14 | 27 | 48 | 7 |
| 80° C. | 24 hours | 55 | 100 | 100 | 12 | 100 | 100 | — | 22 | 31 | 29 | 0 |
| | 48 hours | — | 100 | 100 | — | 100 | 100 | — | — | — | — | — |
| | 72 hours | 100 | 100 | 100 | — | 100 | 100 | — | — | — | — | 2 |
| | 168 hours | — | 100 | 100 | 100 | 100 | 100 | — | 41 | 100 | 100 | 27 |
| Mass loss rate (%) | | | | | | | | | | | | |
| 66° C. | 24 hours | −10.1 | −0.7 | −0.2 | −1.4 | −1.6 | 26.5 | −1.5 | −2.0 | −2.0 | −5.7 | −1.5 |
| | 48 hours | −1.8 | — | — | −1.9 | 3.2 | 38.0 | −2.0 | −2.0 | −2.5 | −2.0 | — |
| | 72 hours | −1.9 | 1.7 | 0.4 | −1.9 | 10.4 | 46.0 | −1.9 | −2.0 | −2.6 | −2.0 | −1.8 |
| | 168 hours | −0.1 | 7.5 | 6.6 | −0.6 | 33.5 | 50.8 | −1.8 | −1.4 | −2.2 | −1.1 | −1.3 |
| 80° C. | 24 hours | −1.9 | 3.7 | 0.1 | −2.0 | 4.5 | 44.5 | −2.3 | −2.2 | −2.8 | −2.2 | −1.3 |
| | 48 hours | −2.2 | — | — | −2.3 | 17.9 | 50.6 | −2.5 | −2.5 | −3.0 | −2.5 | — |
| | 72 hours | −1.4 | 12.8 | 9.7 | −2.3 | 29.5 | 83.1 | −2.3 | −2.2 | −3.1 | −2.5 | −2.1 |
| | 168 hours | 8.4 | 27.5 | 38.3 | −1.2 | 49.8 | — | −1.4 | −1.6 | −2.0 | 0.0 | −1.6 |

Thus, selecting the optimal combination of degradable rubber and degradation accelerator according to the downhole environment can contribute to reduced expense or shortening of processes for well drilling (recovery of hydrocarbon resources) because the substantial expense and time for retrieving or physically destroying the member for downhole tools for the purpose of releasing the plug (seal) of a space between a downhole tool such as a plug for well drilling and the casing or releasing the protection of sensors, flow paths, and the like become unnecessary.

Additionally, the operations of retrieving or physically destroying various members for downhole tools can be made completely unnecessary because the downhole tool comprises the degradable rubber member for downhole tools of the present invention as well as other members formed from degradable materials. A downhole tool such as a plug for well drilling comprising the degradable rubber member for downhole tools of the present invention needs to have a diversity of performance maintenance time and degradation time according to the environment such as downhole temperature and according to the processes carried out in that environment. The degradable seal member (degradable rubber member) for downhole tools of the present invention can have the characteristic of maintaining a sealing function for a certain time and then losing the sealing function and releasing the seal in a variety of downhole temperature environments, such as 177° C., 163° C., 149° C., 121° C., 93° C., 80° C., or 66° C., as well as 25 to 40° C. In the degradable seal member for downhole tools of the present invention, the factors that control the sealing function maintenance time or speed at which the sealing function is lost and the degree to which they can be controlled differ depending on the combination of types of degradation accelerator and degradable rubber, and can be adjusted by various techniques.

Shape and Size of Degradable Rubber Member for Downhole Tools

The shape and size of the degradable rubber member for downhole tools of the present invention are not particularly limited, and may be adjusted so as to be compatible with the type, shape, and size of the downhole tool comprising the degradable rubber member for downhole tools such as a degradable seal member for downhole tools or a degradable protecting member for downhole tools. For example, the degradable rubber member for downhole tools may have a shape such as a sheet shape (thin film shape, thick plate shape, and the like), rod shape (round rod shape, square pillar shape, and the like), rectangular shape (including a cuboid shape), ball shape, or other lump shape (regular shape, irregular shape, and the like). When the degradable seal member for downhole tools of the present invention is sheet-shaped or is a sealing material or packing material, it does not necessarily need to be a molded article having a certain shape. Furthermore, when the downhole tool comprising the degradable seal member for downhole tools of the present invention is a plug for well drilling or the like, a degradable seal member for downhole tools that is an annular molded article, and more specifically, it may be a degradable seal member for downhole tools in which an annular molded article is disposed on an outer circumferential surface orthogonal to the axial direction of a mandrel provided in the downhole tool, or it may be a degradable seal member for downhole tools provided in a plug for well drilling such as a frac plug or bridge plug, and further, it may be a degradable seal member for downhole tools that is a ball or a ball seat. Similarly, considering the shape and size of the sensors, flow paths, or the like to be protected, the degradable protecting member for downhole tools may be a sheet shape, a prescribed shape corresponding to the shape of the sensors or the like, or an irregular shape, and may be adjusted in size as necessary.

5. Method for Manufacturing Degradable Rubber Member for Downhole Tools

The method for manufacturing the degradable rubber member for downhole tools such as a degradable seal member for downhole tools of the present invention is not particularly limited. For example, a molded product of a prescribed shape is molded by injection molding, extrusion molding (including solidification-and-extrusion molding), centrifugal molding, compression molding, or another known molding method, using, as a molding starting material, a composition that is a rubber material containing a prescribed amount of degradation accelerator, a degradable rubber, and other components contained as desired, or, premolded products of appropriate shapes (for example, a rod, thick plate, or the like)is molded, and after machining such as cutting or perforating as necessary, they may be combined by known methods to produce a degradable rubber member for downhole tools.

II. Downhole Tool

According to the present invention, a downhole tool comprising the above degradable rubber member for downhole tools is provided. The type, shape, and size of the downhole tool are not particularly limited. For example, the degradable rubber member for downhole tools of the present invention may be used as a protecting member or as a seal member in a sleeve system (frac sleeve); a seal member such as a ball valve or flapper valve within a downhole tool; a seal member that can temporarily block fluid by being disposed in openings between a downhole tool and the casing; and seal members in many other seal applications, such as sealing a borehole, in which the seal member is present in a form that protects and seals by covering metal downhole tool members, sensors, flow paths, and the like by means of these metal portions expanding in diameter. From the perspective of more effectively exhibiting disintegrability which arises from degradability, which is a characteristic of the degradable rubber member for downhole tools of the present invention, a preferred downhole tool is a plug for well drilling, and more preferred is a frac plug or a bridge plug.

Plug for Well Drilling

As the downhole tool comprising the degradable rubber member for downhole tools of the present invention (also called "downhole tool of the present invention" hereinafter), a more preferred plug for well drilling has a known structure that comprises a mandrel (either solid or having a hollow portion) and various downhole tool members disposed on the outer circumferential surface orthogonal to the axial direction of the mandrel. Examples of downhole tool members include diameter-expandable annular seal members that expand in diameter and plug the spaces between downhole tools (plugs for well drilling) and the casing to seal fluid, and/or slips, wedges, rings, and other members that expand in diameter to fix the downhole tools (plugs for well drilling) and the casing each other, and those comprising known members (for example, sensors and the like) may be used.

The downhole tool of the present invention comprises, for example, a degradable seal member (degradable rubber member) that is an annular molded article, and preferably, it comprises a degradable seal member that is an annular molded article disposed on the outer circumferential surface orthogonal to the axial direction of a mandrel. The downhole tool of the present invention may also comprise a degradable seal member for downhole tools that is a ball or a ball seat.

As other downhole tool members provided in the downhole tool of the present invention, mandrels, slips, wedges, rings, and the like may be selected from a range of those having the materials, shapes, sizes, mechanical characteristics, and the like conventionally used for the relevant downhole tool. Thus, for example, as a mandrel or the like, one formed from a degradable material may be used, and further, one formed from a material containing a reinforcing material may be used, and additionally, one formed from a composite with another member formed from another material may be used. Additionally, the mandrel may have a hollow portion, and the diameter thereof may vary along the axial direction, and the mandrel may also have fixture parts, steps, indentations, protrusions, or the like on the outer surface.

Sealing of Downhole Using Downhole Tool

To achieve reliable fluid sealing by a downhole tool, the degradable seal member (degradable rubber member) for downhole tools of the present invention can plug a space between the casing of a borehole and a downhole tool. For example, the degradable seal member may be an annular molded article, and preferably an annular molded article disposed on the outer circumferential surface orthogonal to the axial direction of a mandrel provided in the downhole tool, or a member that expands in diameter in a direction orthogonal to the axial direction as it shrinks in diameter due to being compressed in the axial direction, or a ball or ball seat.

Because the degradable rubber member for downhole tools of the present invention is formed from a rubber material containing from 0.1 to 20 parts by mass of degradation accelerator relative to 100 parts by mass of degradable rubber, it can have excellent fluid sealing capability. Fluid sealing capability can be measured by the following method. Specifically, (1) a sample (annular rubber member) cut to a certain shape with an outer diameter of 90 mm and inner diameter of 60 mm from a degradable rubber member for downhole tools is set in a jig to which an outer tube with an inner diameter of 103.1 mm and a core rod with an outer diameter of 60 mm are attached, (2) the sample (annular rubber member) is compressed in the axial direction of the jig, and between the outer tube and core rod part of the jig are sealed by the sample (annular rubber member), (3) hydraulic pressure is applied, and the hydraulic pressure when the seal fails (in most cases, large deformation force is applied to the two ends of the sample, i.e., the annular rubber member, in the axial direction of the jig, and as a result, those sites break and the seal fails) (also called "breaking hydraulic pressure") is measured. The fluid sealing capability is considered excellent as long as the breaking hydraulic pressure is not less than 20 MPa, but it is preferably not less than 23 MPa, and more preferably not less than 26 MPa. The breaking hydraulic pressure of the degradable rubber member for downhole tools may be adjusted by the type of degradable rubber, the type and content of the degradation accelerator, and the like. For example, by containing 5 parts by mass of glycolide as a degradation accelerator relative to 100 parts by mass of thermosetting polyurethane (urethane rubber) of hardness A90°, breaking hydraulic pressure of approximately 29 MPa can be obtained. Furthermore, by containing 10 parts by mass of glycolide as a degradation accelerator relative to 100 parts by mass of thermosetting polyurethane (urethane rubber) of hardness A98°, breaking hydraulic pressure of greater than 46 MPa (seal does not fail even when a hydraulic pressure of 46 MPa is applied) can be obtained. Additionally, by containing 0.1 parts by mass of MPTS as a degradation accelerator relative to 100 parts by mass of thermosetting polyurethane (urethane rubber) of hardness A90°, breaking hydraulic pressure of approximately 37 MPa can be obtained, and similarly, by containing 0.5 parts by mass of MPTS, a breaking hydraulic pressure of approximately 30 MPa can be obtained.

III. Method for Well Drilling

According to the method for well drilling using the degradable rubber member for downhole tools of the present invention, for example, a method for well drilling in which fluid between a downhole tool and a casing is sealed using a downhole tool such as a plug for well drilling comprising the degradable seal member for downhole tools, and, according to a method for well drilling in which isolation treatment of a borehole is performed using the degradable rubber member for downhole tools of the present invention, for example, using a downhole tool such as a plug for well drilling comprising a degradable seal member for downhole tools, and then the downhole tool is degraded, specifically, all or part of the downhole tool such as a plug for well drilling comprising the degradable seal member for downhole tools is degraded, it is possible to design such that the seal by the degradable seal member for downhole tools that is plugging the borehole can be easily released within a desired period in the relevant downhole environment when fracturing of the prescribed sections is finished or when production of petroleum or natural gas or the like begins after well drilling is finished and the well has been completed. Similarly, in the method for well drilling using a downhole tool comprising a degradable protecting member for downhole tools, it is possible to design such that protection of the sensors, flow paths, or the like can be released within a desired period in the relevant downhole environment. As a result, according to the method for well drilling of the present invention, the substantial expense and time conventionally required for the operation of destroying the sealing function to release the seal after well treatment is finished or the well is completed, and the operation of releasing protection by a protecting member, and also for destroying or fragmentizing the member such as multiple plugs for well drilling or seal members or protecting members remaining in the well by crushing, perforation, or another method, become unnecessary. As a result, it is possible to decrease the expense and shorten the processes of well drilling. A1

Plugging of borehole

To describe sealing and the release of sealing, in the downhole tool of the present invention, by applying force to the degradable seal member for downhole tools, for example, to a pair of rings in the axial direction of a mandrel, the degradable seal member for downhole tools expands in diameter in the direction orthogonal to the axial direction of the mandrel as it is compressed and shrinks in diameter in the axial direction, and the outward part in the direction orthogonal to the axial direction comes into contact with the inside wall of the downhole, and the inward part in the direction orthogonal to the axial direction comes into contact with the outer circumferential surface of the mandrel. As a result, the downhole tool plugs the space between the downhole tool and the downhole, and seal fluid. Furthermore, when the aforementioned plugging (sealing) or downhole protection or the like is performed in a downhole which is a high-temperature environment where the degradable rubber member for downhole tools ends up degrading in a short time, a treatment method can be employed in which the seal performance (strength and the like) and the protective function can be maintained for a desired duration by controlling the ambient temperature of the degradable rubber member for downhole tools by injecting fluid from above ground (cooldown injection).

Degradation of Downhole Tool

With the downhole tool such as a plug for well drilling of the present invention, the sealing function of the degradable seal member for downhole tools can be destroyed, and the member together with, as desired, downhole tool members other than the degradable seal member for downhole tools, such as degradable mandrels, slips, rings, or the like, can be easily removed by being degraded or disintegrated by a variety of means that are not only capable of biodegrading, hydrolyzing, or chemically degrading or dissolving them in a solvent by some other method but are also capable of disintegrating the degradation accelerator after fracturing of the prescribed sections is finished, typically when production of petroleum or natural gas or the like begins after well drilling is finished and the well has been completed. That is, the fact that the degradable seal member for downhole tools loses a seal function and is degraded as desired after isolation treatment of a borehole is performed using the degradable seal member for downhole tools of the present invention provides the following advantages: (i) the seal for preventing movement of fluid inside the well can be released within a desired period; (ii) useless downhole tools that hinder production are easy to remove; (iii) a downhole tool that does not require crushing treatment before the start of production can be obtained by forming other members provided in the downhole tool from a degradable material such as PGA or PLA (more preferably, PGA); and (iv) it can be applied to various downhole tools used in a diversity of processes in which any sort of sealing is required, without limitation to downhole tools used in fracturing processes. The method for well drilling that protect sensors and the like using the degradable protecting member for downhole tools of the present invention also has the same advantages. Furthermore, it is preferred that the degradable rubber member for downhole tools remaining after the well treatment has been finished preferably disappears completely by the time production is begun. Even if the rubber member does not disappear completely, as long as the rubber member is in a state that its strength decreases and it can be disintegrated by stimulation such as water flow in the downhole, the disintegrated degradable rubber member for downhole tools can be easily retrieved by flowback or the like. This does not cause clogging in the downhole or fractures, and thus does not hinder production of the petroleum, natural gas, or the like. Additionally, normally, the higher the downhole temperature, the shorter the time required for degradation and strength decrease of the degradable rubber member for downhole tools. Furthermore, depending on the well, the moisture content in the subterranean formation is sometimes low, and in this case, degradation of the downhole tool can be accelerated by allowing the water-based fluid used during fracturing to remain in the well without recovering the downhole tool after fracturing.

Specific aspects of the present invention further provide: i) a method for well drilling, the method comprising sealing a borehole using the downhole tool comprising the degradable rubber member for downhole tools of the present invention, after which the degradable rubber member for downhole tools is degraded inside the borehole; ii) a method for well drilling, the method comprising sealing a borehole using the downhole tool comprising the degradable rubber member for downhole tools of the present invention and further comprising another member for downhole tools containing a degradable material (preferably PGA), after which the degradable rubber member for downhole tools is degraded inside the borehole and iii) a method for well drilling, the method comprising performing a well treatment using the downhole tool comprising the degradable rubber member for downhole tools of the present invention, the downhole tool being disposed such that the degradable rubber member for downhole tools contacts another member for downhole tools and/or covers the other member for downhole tools, after which the degradable rubber member for downhole tools is degraded inside the borehole.

INDUSTRIAL APPLICABILITY

The present invention can provide a degradable rubber member for downhole tools comprising a rubber material containing from 0.1 to 20 parts by mass of a degradation accelerator relative to 100 parts by mass of degradable rubber, a degradable seal member for downhole tools which is designable so that reliably seals fluid and makes various well treatments easy and that the seal can be released during a desired period and its removal and a flow path and the like can be assured, and a degradable protecting member for protecting a sensor, a flow path, and the like, which is designable to be easily removed as desired, regardless to the fact that excavation conditions have become diverse, and that is also capable of contributing to decreased expense and shortening of processes of well drilling. Additionally, it can provide a downhole tool comprising the member, and a method for well drilling. Thus, its industrial applicability is high.

The invention claimed is:

1. A degradable rubber member for downhole tools, the degradable rubber member being (i) configured to be included in a downhole tool and (ii) decompose as a result of contact with water, the degradable rubber member comprising
a rubber material containing from 0.1 to 20 parts by mass of a degradation accelerator relative to 100 parts by mass of a degradable rubber,
wherein the degradable rubber contains a urethane rubber having an ester bond in the main chain, and
wherein the degradation accelerator is an acidic substance.

2. The degradable rubber member for downhole tools according to claim 1, wherein the member is stable in a dry environment, and a decrease rate of 50% strain compressive stress after immersion for 6 hours in 23° C. water relative to 50% strain compressive stress after immersion for 1 hour is less than 5%.

3. The degradable rubber member for downhole tools according to claim 1, wherein the degradation accelerator is selected at least one of the group consisting of glycolide, lactide, ε-caprolactone, polyglycolic acid, polylactic acid, methyl p-toluenesulfonate, and 3,3',4,4'-benzophenone tetracarboxylic dianhydride.

4. The degradable rubber member for downhole tools according to claim 1, wherein the member is a seal member.

5. The degradable rubber member for downhole tools according to claim 1, wherein the member is a ball or a ball seat.

6. The degradable rubber member for downhole tools according to claim 1, wherein the member is a degradable protecting member for downhole tools.

7. The degradable rubber member for downhole tools according to claim 1, wherein the member is provided in a plug for well drilling.

8. A downhole tool comprising the degradable rubber member for downhole tools according to claim 1.

9. The downhole tool according to claim 8, wherein the tool is a plug for well drilling.

10. A method for well drilling, wherein the method comprises
drilling a well and forming a borehole, and
sealing the borehole with the downhole tool according to claim 8, after which the degradable rubber member for the downhole tool is degraded inside the borehole.

11. A method for well drilling, wherein the method comprises
drilling a well and forming a borehole, and
sealing the borehole with the downhole tool according to claim 8, wherein said downhole tool includes another member for downhole tools containing a degradable material, after which the degradable rubber member for the downhole tool is degraded inside the borehole.

12. A method for well drilling, wherein the method comprises
drilling a well and forming a borehole, and
performing a well treatment with the downhole tool according to claim 8, wherein the downhole tool is disposed such that the degradable rubber member for downhole tools contacts another member for downhole tools and/or covers the other member for downhole tools, after which the degradable rubber member for the downhole tool is degraded inside the borehole.

13. A method for well drilling, wherein the method comprises
drilling a well and forming a borehole, and
sealing the borehole with the degradable rubber member for downhole tools according to claim 1.

14. A degradable rubber member for downhole tools, the degradable rubber member being (i) configured to be included in a downhole tool and (ii) hydrolyze as a result of contact with a fluid, the degradable rubber member comprising
a rubber material containing from 0.1 to 20 parts by mass of a degradation accelerator relative to 100 parts by mass of a degradable rubber, wherein a loss rate of mass or a decrease rate of 50% strain compressive stress after immersion for 24 hours in 150° C. water relative to mass or to 50% strain compressive stress before immersion is not less than 5%,
wherein the degradable rubber contains a urethane rubber having an ester bond in the main chain, and
wherein the degradation accelerator is an acidic substance.

15. A degradable rubber member for downhole tools, the degradable rubber member being (i) configured to be included in a downhole tool and (ii) hydrolyze as a result of contact with a fluid, the degradable rubber member comprising
a rubber material containing from 0.1 to 20 parts by mass of a degradation accelerator relative to 100 parts by mass of a degradable rubber, wherein a loss rate of mass after immersion for 72 hours in 150° C. water relative to mass before immersion is from 5% to 100%,
wherein the degradable rubber contains a urethane rubber having an ester bond in the main chain, and
wherein the degradation accelerator is an acidic substance.

* * * * *